US012705447B2

(12) United States Patent
Witherspoon et al.

(10) Patent No.: US 12,705,447 B2
(45) Date of Patent: Aug. 11, 2026

(54) DECOUPLED ACQUISITION/DECODING FOR HIGH-SPEED INDICIA READING

(71) Applicant: ZEBRA TECHNOLOGIES CORPORATION, Lincolnshire, IL (US)

(72) Inventors: James Matthew Witherspoon, Howell, MI (US); Thomas J. Stevenson, Wixom, MI (US); Paul D. Haist, Toronto (CA); Mathieu Larouche, Terrebonne (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/375,423

(22) Filed: Sep. 29, 2023

(65) Prior Publication Data

US 2025/0111182 A1 Apr. 3, 2025

(51) Int. Cl.
*G06K 7/14* (2006.01)
*G06V 10/25* (2022.01)

(52) U.S. Cl.
CPC ........... *G06K 7/1443* (2013.01); *G06V 10/25* (2022.01)

(58) Field of Classification Search
CPC ... G06K 7/1443; G06K 7/10722; G06V 10/25
See application file for complete search history.

(56) References Cited

U.S. PATENT DOCUMENTS 11,003,881 B2 * 5/2021 Santi .................... G06K 7/1452
12,067,449 B2 * 8/2024 He ............................ G06T 7/70
2007/0080228 A1 4/2007 Knowles
2011/0085732 A1 * 4/2011 Cheng ...................... G06K 7/14 235/462.11
2017/0178226 A1 * 6/2017 Graham ............. G06Q 30/0643
2019/0236531 A1 8/2019 Adato et al.
2022/0172499 A1 6/2022 Davis
2022/0230279 A1 * 7/2022 Yamada ................. G06V 10/96
2023/0034323 A1 * 2/2023 Laffargue ............. G06K 7/1417
2023/0106443 A1 * 4/2023 Kurotobi ............... G01S 7/4802 382/103
2024/0289578 A1 * 8/2024 He ....................... G06K 7/1443

OTHER PUBLICATIONS

PCT/US2024/044954—International Search Report, USPTO ISA/US, Apr. 10, 2025.
PCT/US2024/044954—Written Opinion of the International Searching Authority (ISA), USPTO ISA/US, Apr. 10, 2025.

* cited by examiner

*Primary Examiner* — Sonji N Johnson

(57) ABSTRACT

Methods and systems for avoidance of unintended indicia scanning are disclosed herein. An example system may include an imaging device comprising: (1) one or more image sensors; (2) a processing assembly communicatively coupled to the one or more image sensors and configured to: (i) instruct the one or more image sensors to capture the image data including a plurality of image frames over a FOV, (ii) decode an indicia in an initial image frame of the plurality of image frames to generate decoded indicia data of the indica, (iii) determine a first location associated with the indicia in the initial image frame, (iv) determine a second location associated with the indicia in a subsequent image frame, (v) determine whether a positional difference between the second location and the first location exceeds a threshold value, and (vi) transmit the decoded indicia data of the indicia to a host processor.

14 Claims, 8 Drawing Sheets

200b

500

DECOUPLED ACQUISITION/DECODING FOR HIGH-SPEED INDICIA READING

BACKGROUND

Conventionally, the mass scanning of objects on production lines are performed by smart devices. These smart devices, may individually capture images of the objects on the production, find and decode any indicia located on the object, and/or use machine vision to identify the object based on features of the object itself.

However, these smart devices have several problems: (i) they can be unoptimized or inefficient, (ii) they often rely on lower resolution imaging since the device also process the images they capture, (iii) they typically require specific components and structures for operation, and (iv) they may create unnecessary complexity for further processing.

SUMMARY

In an embodiment, the present invention may be an imaging processing device comprising: (1) a processor and/or (2) a memory communicatively coupled to the processor, wherein the imaging processing device may be configured to: (A) transmit a capturing signal to one or more imaging devices, the capturing signal instructing the one or more imaging devices to capture image data and the one or more imaging devices being directly communicatively connected to the imaging processing device, (B) receive the image data from the one or more imaging devices, (C) analyze at least one frame of the image data to locate a candidate position of an indicia, and/or (D) transmit the image data and the candidate position to a host processor, the host processor being directly communicatively connected to the imaging processing device and not directly communicatively connected to the one or more imaging devices, the host processor being housed in one of either (i) a same housing as the imaging processing device or (ii) a separate housing as the imaging processing device, and/or the host processor being configured to perform at least one of (i) locate the indicia based on the candidate position, (ii) decode the indicia to generate decoded indicia data upon locating the indicia, and/or (iii) transmit the decoded indicia data to an external processor.

Additionally or alternatively, in some embodiments, the imaging processing device may be further configured to: (i) receive a triggering signal from a sensor communicatively connected to the imaging processing device and (ii) in response to receiving the triggering signal, transmit the capturing signal to the one or more imaging devices.

Additionally or alternatively, in some embodiments, the image data may include a plurality of image frames across a set time period. In these embodiments, the imaging processing device may be further configured to: (i) select an image frame from the plurality of image frames and (ii) transmit the selected image frame to the host processor.

Additionally or alternatively, in some embodiments, the imaging processing device receives the image data from two or more imaging devices. In these embodiments, locating the candidate position of the indicia causes the imaging processing device to: (i) locate at least two candidate positions of the indicia within the image data, (ii) determine whether an initial candidate position of the indicia is within a threshold distance from a subsequent candidate position of the indicia, and/or (iii) transmit the at least two candidate positions and the determination to the host processor.

In another embodiment, the present invention may be an imaging processing device comprising: (1) a processor and/or (2) a memory communicatively coupled to the processor, wherein the imaging processing device may be configured to: (A) transmit a capturing signal to one or more imaging devices, the capturing signal instructing the one or more imaging devices to capture image data and the one or more imaging devices being directly communicatively connected to the imaging processing device, (B) receive the image data from the one or more imaging devices, (C) analyze at least one frame of the image data to locate a candidate position of a point of interest of an object in the image data, and/or (D) transmit the image data and the candidate position to a host processor, the host processor being directly communicatively connected to the imaging processing device and not directly communicatively connected to the one or more imaging devices, the host processor being housed in one of either (i) a same housing as the imaging processing device or (ii) a separate housing as the imaging processing device, and/or the host processor being configured to perform at least one of (i) locate one or more points of interest of the object based on the candidate position, (ii) identify an aspect of the object using one or more machine vision models, and/or (iii) transmit an output of the one or more machine vision models to an external processor.

In yet another embodiment, the present invention may be a computer-implemented method comprising: (1) transmitting, by an imaging processing device, a capturing signal to one or more imaging devices, the capturing signal instructing the one or more imaging devices to capture image data and the one or more imaging devices being directly communicatively connected to the imaging processing device; (2) receiving, by the imaging processing device, the image data from the one or more imaging devices; (3) analyzing, by the imaging processing device, at least one frame of the image data to locate a candidate position of an indicia; and/or (4) transmitting, by the imaging processing device, the image data and the candidate position to a host processor, the host processor being directly communicatively connected to the imaging processing device and not directly communicatively connected to the one or more imaging devices, the host processor being housed in one of either (i) a same housing as the imaging processing device or (ii) a separate housing as the imaging processing device, and/or the host processor being configured to perform at least one of (i) locate the indicia based on the candidate position, (ii) decode the indicia to generate decoded indicia data upon locating the indicia, and/or (iii) transmit the decoded indicia data to an external processor.

Additionally or alternatively, in some embodiments, the computer-implemented method may further include: (1) receiving, by the imaging processing device, a triggering signal from a sensor communicatively connected to the imaging processing device and (2) in response to receiving the triggering signal, transmitting, by the imaging processing device, the capturing signal to the one or more imaging devices.

Additionally or alternatively, in some embodiments, the image data may include a plurality of image frames across a set time period. In these embodiments, the computer-implemented method may further include: (1) selecting, by the imaging processing device, an image frame from the plurality of image frames and (2) transmitting, by the imaging processing device, the selected image frame to the host processor.

Additionally or alternatively, in some embodiments, the imaging processing device receives the image data from two or more imaging devices. In these embodiments, locating the candidate position of the indicia includes: (1) locating, by the imaging processing device, at least two candidate positions of the indicia within the image data; (2) determining, by the imaging processing device, whether an initial candidate position of the indicia is within a threshold distance from a subsequent candidate position of the indicia, and/or (3) transmitting, by the imaging processing device, the at least two candidate positions and the determination to the host processor.

Additionally or alternatively, in some embodiments, the capturing signal to the two or more imaging devices configure the two or more imaging devices to capture the image data simultaneously.

Additionally or alternatively, in some embodiments, the one or more imaging devices are not configured to decode indicia.

In a further embodiment, the present invention may be a computer-implemented method comprising: (1) transmitting, by an imaging processing device, a capturing signal to one or more imaging devices, the capturing signal instructing the one or more imaging devices to capture image data and the one or more imaging devices being directly communicatively connected to the imaging processing device; (2) receiving, by the imaging processing device, the image data from the one or more imaging devices; (3) analyzing, by the imaging processing device, at least one frame of the image data to locate a candidate position of a point of interest of an object in the image data; and/or (4) transmitting, by the imaging processing device, the image data and the candidate position to a host processor, the host processor being directly communicatively connected to the imaging processing device and not directly communicatively connected to the one or more imaging devices, the host processor being housed in one of either (i) a same housing as the imaging processing device or (ii) a separate housing as the imaging processing device, and/or the host processor being configured to perform at least one of (i) locate one or more points of interest of the object based on the candidate position, (ii) identify an aspect of the object using one or more machine vision models, and/or (iii) transmit an output of the one or more machine vision models to an external processor.

Advantages will become more apparent to those of ordinary skill in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
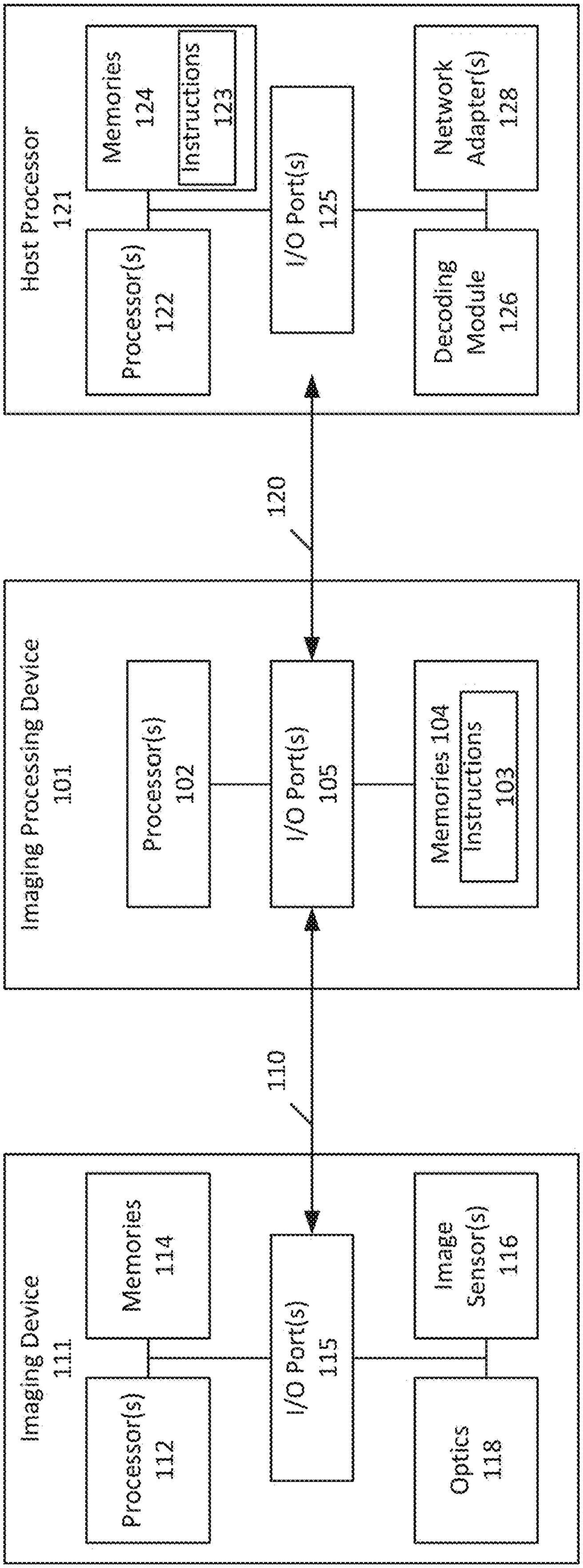
FIG. 1A illustrates an example computing environment for implementing the decoupled acquisition decoding for high-speed indicia reading.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure relates generally to an imaging processing device that may be connected to one or more imaging devices and/or a host processor. The one or more imaging devices may capture image data of objects and transmit them to the imaging processing device. The image processing device may analyze the image data to locate candidate positions of indicia and/or points of interest of the object and may transmit both the image data and the candidate positions to the host processor. The host processor may in turn (i) locate indicia in the image data based on the candidate position, (ii) decode located indicia to generate decoded indicia data, (iii) identify objects based upon machine vision and/or machine learning, and/or (iv) transmit the decoded indicia data and/or the object identification data to an external processor.

The benefits of the above described system allow for the decoupling of various tasks to allow for an increase in optimization and efficiency in computing resources. For example, in some embodiments, the imaging processing device and the host processor may process the image data in parallel to determine the location of indicia and decode the indicia at a much faster rate than conventional systems. Additionally, the segmentation of tasks allows for the generalization of components. For example, as described below, any imaging device capable of capturing image data may be employed.

Figure 1B:
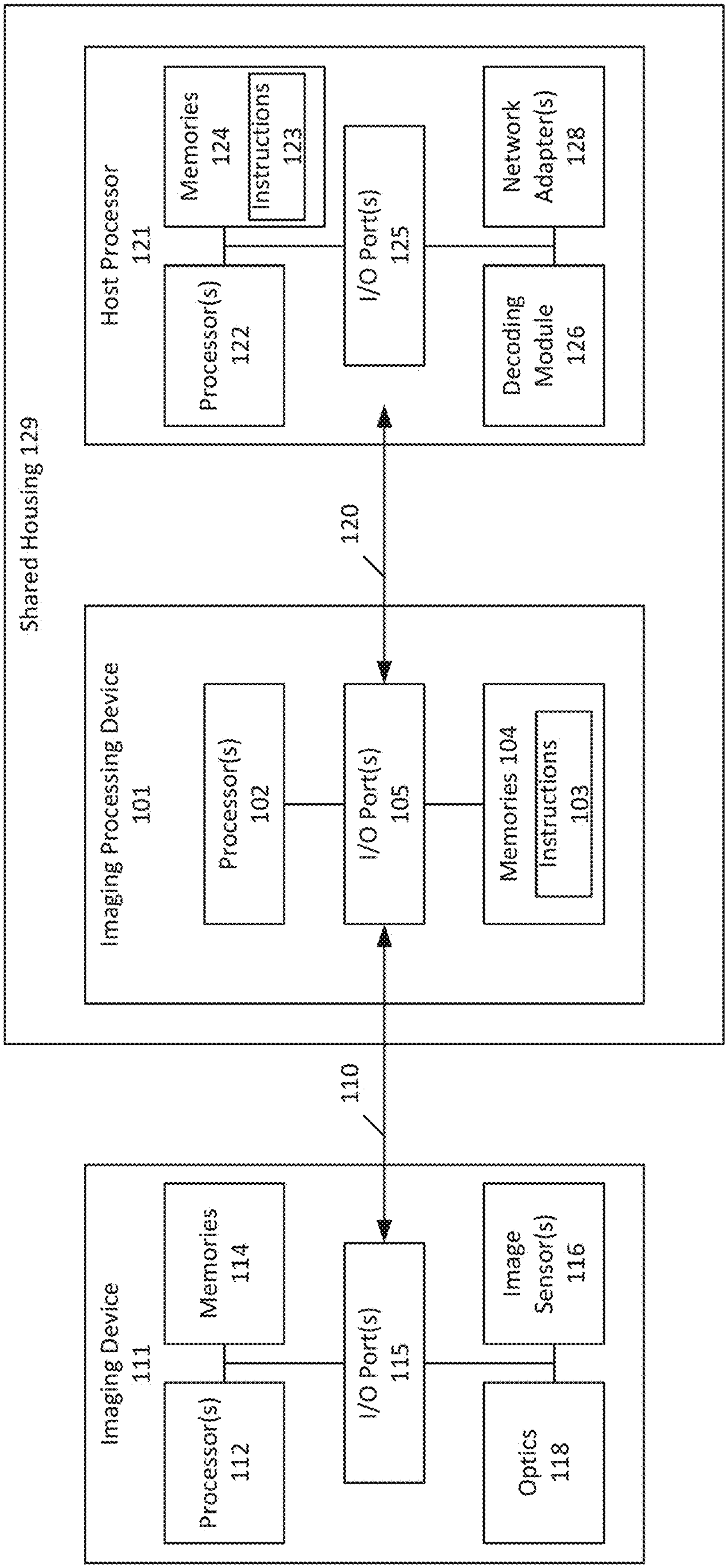
FIG. 1B illustrates another example computing environment for the decoupled acquisition decoding for high-speed indicia reading.

FIGS. 1A and 1B illustrate example computing environments for implementing the decoupled acquisition decoding for high-speed indicia reading. The example computing environments may include an imaging processing device 101, an imaging device 111, and a host processor 121.

The imaging processing device 101 may include one or more processors 102, one or more memories 104, and/or one or more input and/or output (I/O) ports 105. Any of these components of the imaging processing device 101 may be communicatively coupled to one another via a dedicated communication bus. In one example, the imaging processing device 101 may be a frame grabbing processor, also referred to as a "frame grabber."

The one or more processors 102 may be one or more central processing units (CPUs), one or more coprocessors, one or more microprocessors, one or more graphical processing units (GPUs), one or more digital signal processors (DSPs), one or more application specific integrated circuits (ASICs), one or more programmable logic devices (PLDs), one or more field-programmable gate arrays (FPGAs), one or more field-programmable logic devices (FPLDs), one or more microcontroller units (MCUs), one or more hardware accelerators, one or more special-purpose computer chips, and one or more system-on-a-chip (SoC) devices, etc.

The one or more memories 104 may be any local short term memory (e.g., random access memory (RAM), read only memory (ROM), cache, etc.) and/or any long term memory (e.g., hard disk drives (HDD), solid state drives (SSD), etc.).

The one or more memories 104 may store machine readable instructions 103, including any of one or more application(s) and/or one or more software component(s) which may be implemented to facilitate and/or perform the features, functions, or other disclosure described herein, such as any methods, processes, elements or limitations, as illustrated, depicted, and/or described for the various flowcharts, illustrations, diagrams, figures, and/or other disclosure herein.

As an example, the machine readable instructions 103 of the imaging processing device 101 may instruct, direct and/or cause the imaging processing device 101 to transmit a capturing signal to the imaging device 111. As another example, the machine readable instructions 103 of the imaging processing device 101 may instruct, direct and/or cause the imaging processing device 101 to select one or more image frames of image data. As yet another example, the machine readable instructions 103 of the imaging processing device 101 may instruct, direct and/or cause the imaging processing device 101 to determine one or more candidate positions of indicia and/or points of interest in image data and/or one or more selected image frames of the image data. As a further example, the machine readable instructions 103 of the imaging processing device 101 may instruct, direct and/or cause the imaging processing device 101 to transmit image data, one or more selected image frames, and/or determined candidate positions of indicia and/or points of interest to the host processor 121. The machine readable instructions 103 of the imaging processing device 101 may also instruct, direct and/or cause the imaging device 111 and/or the host processor 121 to facilitate and/or perform the features, functions, or other disclosure described herein.

The one or more processors 102 may include one or more registers capable of temporarily storing data, and the one or more processors 102 may include further storage capacity in the form of integrated memory slots. The one or more processors 102 may interact with the any of the forgoing (e.g., registers, integrated memory slots, one or more memories 104, etc.) to obtain, for example, machine-readable instructions corresponding to, for example, the operations represented by the flowcharts of this disclosure.

The one or more I/O ports 105 may be, or may include, any number of different types of I/O units, I/O interfaces, and/or I/O circuits that enable the one or more processors 102 of the imaging processing device 101 to communicate with external devices (e.g., the one or more I/O ports 115 of the imaging device 111 and/or the one or more I/O ports 125 of the host processor 121). In particular, the one or more I/O ports 105 of the imaging processing device 101 may have a direct connection 110 to the one or more I/O ports 115 of the imaging device 111 (e.g., via dedicated coupling via a communication bus, a wired connection, a wireless connection, etc.) to allow for the imaging processing device 101 to receive digital signals and/or data from and/or transmit digital signals and/or data to the imaging device 111. Similarly, the one or more I/O ports 105 of the imaging processing device 101 may be directly connected 110 to the one or more I/O ports 125 of the host processor 121 (e.g., via dedicated coupling via a communication bus, a wired connection, a wireless connection, etc.) to allow for the imaging processing device 101 to receive digital signals and/or data from and/or transmit digital signals and/or data to the host processor 121. For example, the imaging processing device 101 may transmit a capturing signal to the imaging device 111 via the direct connection 110, and the imaging processing device 101 may transmit image data to the host processor 121 via the direct connection 120.

In operation, in some embodiments, the imaging processing device 101 may be configured to transmit a capturing signal to the imaging device 111 to capture image data. The capturing signal may be any sort of digital communication signal that instructs, directs and/or causes the imaging device 111 to capture the image data. In some embodiments, the capturing signal is transmitted in response to an incoming digital communication signal (e.g., a signal flag triggered by an electronic sensor communicatively connected to the imaging processing device 101). In some alternative embodiments, the capturing signal is transmitted at the start of the methods and systems described herein and the capturing signal instructs, directs and/or causes the imaging device 111 to capture the image data over a period of time (e.g., via a burst image, a video recording, a video stream, etc.). In these embodiments, the image data may include a plurality of image frames-image frames or frames being individual images per discrete time period (e.g., 24 image frames per second). Additionally, in embodiments where two or more imaging devices 111 are employed, the capturing signal may instruct, direct and/or cause each imaging device 111 to capture image data at about the same time as each other imaging device 111.

The imaging processing device 101 may receive any image data captured by the imaging device 111, and the imaging processing device 101 may analyze or process any of the received image data. For example, in the embodiments where the image data has multiple image frames in the image data (e.g., the image data is a video recording), the imaging processing device 101 may select one or more image frames from the image data (e.g., the image frame(s) with a highest resolution of an object, the image frame(s) with a greatest focus measure among the other image frames, etc.). As another example, the imaging processing device 101 may process the one or more image frames to determine one or more candidate positions of an indicia and/or points of interest in an object in the one or more image frames.

The imaging processing device 101 may transmit the image data (e.g., either the entirety of the image data with an indication of the image frame(s) selected or only the selected image frame(s)) and/or any data derived from the image data (e.g., candidate positions of indicia and/or points of interest of an object) to the host processor 121.

The imaging device 111 may include one or more processors 112, one or more memories 114, one or more I/O ports 115, one or more image sensors 116, and/or one or more optics 118. Any of these components of the imaging device 111 may be communicatively coupled to one another via a dedicated communication bus. In one example, the imaging device 111 may be a camera device. In another example, the imaging device 111 may be a scanning device (such as a monoptic scanner, a bioptic scanner, etc.).

The one or more processors 112 may be one or more central processing units (CPUs), one or more coprocessors, one or more microprocessors, one or more graphical processing units (GPUs), one or more digital signal processors (DSPs), one or more application specific integrated circuits (ASICs), one or more programmable logic devices (PLDs), one or more field-programmable gate arrays (FPGAs), one or more field-programmable logic devices (FPLDs), one or more microcontroller units (MCUs), one or more hardware accelerators, one or more special-purpose computer chips, and one or more system-on-a-chip (SoC) devices, etc.

The one or more memories 114 may be any local short term memory (e.g., random access memory (RAM), read only memory (ROM), cache, etc.) and/or any long term memory (e.g., hard disk drives (HDD), solid state drives (SSD), etc.). The one or more memories 114 may also store machine readable instructions, including any of one or more application(s) and/or one or more software component(s) which may be implemented to facilitate or perform the features, functions, or other disclosure described herein, such as any methods, processes, elements or limitations, as illustrated, depicted, and/or described for the various flowcharts, illustrations, diagrams, figures, and/or other disclosure herein.

The one or more processors 112 may include one or more registers capable of temporarily storing data, and the one or more processors 112 may include further storage capacity in the form of integrated memory slots. The one or more processors 112 may interact with the any of the forgoing (e.g., registers, integrated memory slots, one or more memories 114, etc.) to obtain, for example, machine-readable instructions corresponding to, for example, the operations represented by the flowcharts of this disclosure.

The one or more I/O ports 115 may be, or may include, any number of different types of I/O units, I/O interfaces, and/or I/O circuits that enable the one or more processors 112 of the imaging device 111 to communicate with external devices (e.g., the one or more I/O ports 105 of the imaging processing device 101). In particular, the one or more I/O ports 115 of the imaging device 111 may have a direct connection 110 to the one or more I/O ports 105 of the imaging processing device 101 (e.g., via dedicated coupling via a communication bus, a wired connection, a wireless connection, etc.) to allow for the imaging device 111 to receive digital signals and/or data from and/or transmit digital signals and/or data to the imaging processing device 101. For example, the imaging device 111 may transmit image data to the imaging processing device 101 via the direct connection 110. In some embodiments, the one or more I/O ports 115 of the imaging device 111 and the one or more I/O ports 125 of the host processor 121 are not directly connect, as illustrated in FIGS. 1A and 1B.

The one or more image sensors 116 may be any image capturing unit(s), component(s), and/or sensor capable(s) of capturing image data. For example, the image sensors 116 may be CMOS image sensors, CCD image sensors, and/or other types of image sensor architectures. The image sensors 116 may be configured to capture convert the values of the component sensors into a file format associated with image data.

The one or more optics 118 may be any optical elements, such as collimators, lenses, apertures, compartment walls, etc. that may be attached to and/or detached from a housing of the imaging device 111.

In operation, the imaging device 111 may be configured to capture image data. In embodiments where two or more imaging devices 111 are employed, the two or more imaging devices may be arranged such that the field of view (FOV) of each imaging device 111 has a different perspective than the FOV of each other imaging device 111. In some embodiments, the imaging device 111 may capture the image device upon receiving a capturing signal. In these embodiments, the capturing signal may be received by the imaging processing device 101. Alternatively, in some embodiments, the capturing signal may capture the image data in response to an incoming digital communication signal (e.g., a signal flag triggered by an electronic sensor communicatively coupled to the imaging device 111). In some embodiments, the imaging device 111 may be configured to continuously capture image data over a period of time (e.g., a video recording, a video stream, etc.).

The imaging device 111 may then transmit the image data to imaging processing device 101. In the embodiments where the imaging device 111 is continuously capturing image data over a period of time, the imaging device 111 may transmit the image data in parallel to capturing the image data (e.g., transmitting 24 image frames every second, transmitting a stream of image frames as soon as it is captured, etc.).

In some embodiments, the imaging device 111 lacks one or more functionalities and/or lacks configurations to perform one or more functions that may be found in and/or performed by the imaging processing device 101 and/or the host processor 121. For example, in some embodiments, the imaging device 111 may be unable to perform indicia decoding or indicia-analysis operations, machine vision operations, and/or machine learning operations.

The host processor 121 may include one or more processors 122, one or more memories 124, one or more I/O ports 125, a decoding module 126, and/or one or more network adapters 128. Any of these components of the host processor 121 may be communicatively coupled to one another via a dedicated communication bus. In one example, the host processor 121 is a machine vision processor, also referred to as a "vision controller." In another example, the host processor 121 is a processor of a workstation computing device (such as a computer terminal, a desktop computer, etc.).

The one or more processors 122 may be one or more central processing units (CPUs), one or more coprocessors, one or more microprocessors, one or more graphical processing units (GPUs), one or more digital signal processors (DSPs), one or more application specific integrated circuits (ASICs), one or more programmable logic devices (PLDs), one or more field-programmable gate arrays (FPGAs), one or more field-programmable logic devices (FPLDs), one or more microcontroller units (MCUs), one or more hardware accelerators, one or more special-purpose computer chips, and one or more system-on-a-chip (SoC) devices, etc.

The one or more memories 124 may be any local short term memory (e.g., random access memory (RAM), read only memory (ROM), cache, etc.) and/or any long term memory (e.g., hard disk drives (HDD), solid state drives (SSD), etc.). The one or more memories 124 may store machine readable instructions 123, including any of one or more application(s) and/or one or more software component(s) which may be implemented to facilitate and/or perform the features, functions, or other disclosure described herein, such as any methods, processes, elements or limitations, as illustrated, depicted, and/or described for the various flowcharts, illustrations, diagrams, figures, and/or other disclosure herein.

Figure 2A:
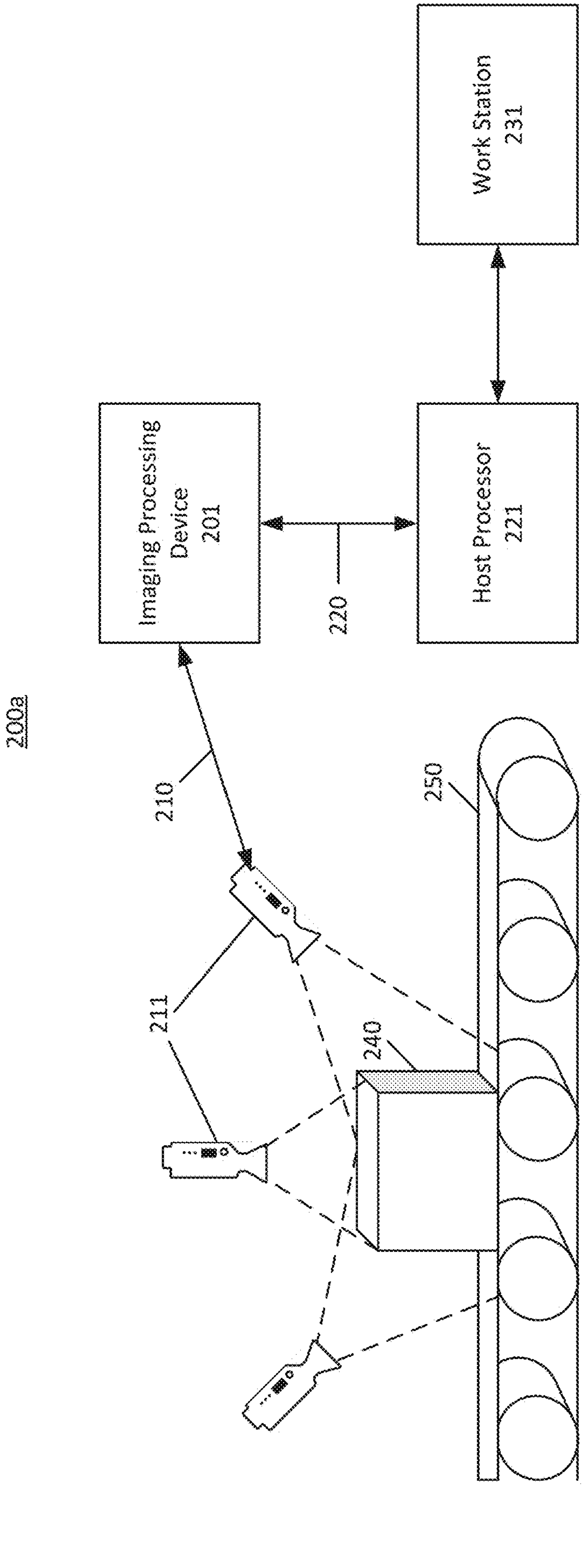
FIG. 2A illustrates an example environment for implementing the methods and
systems described herein.
Figure 2B:
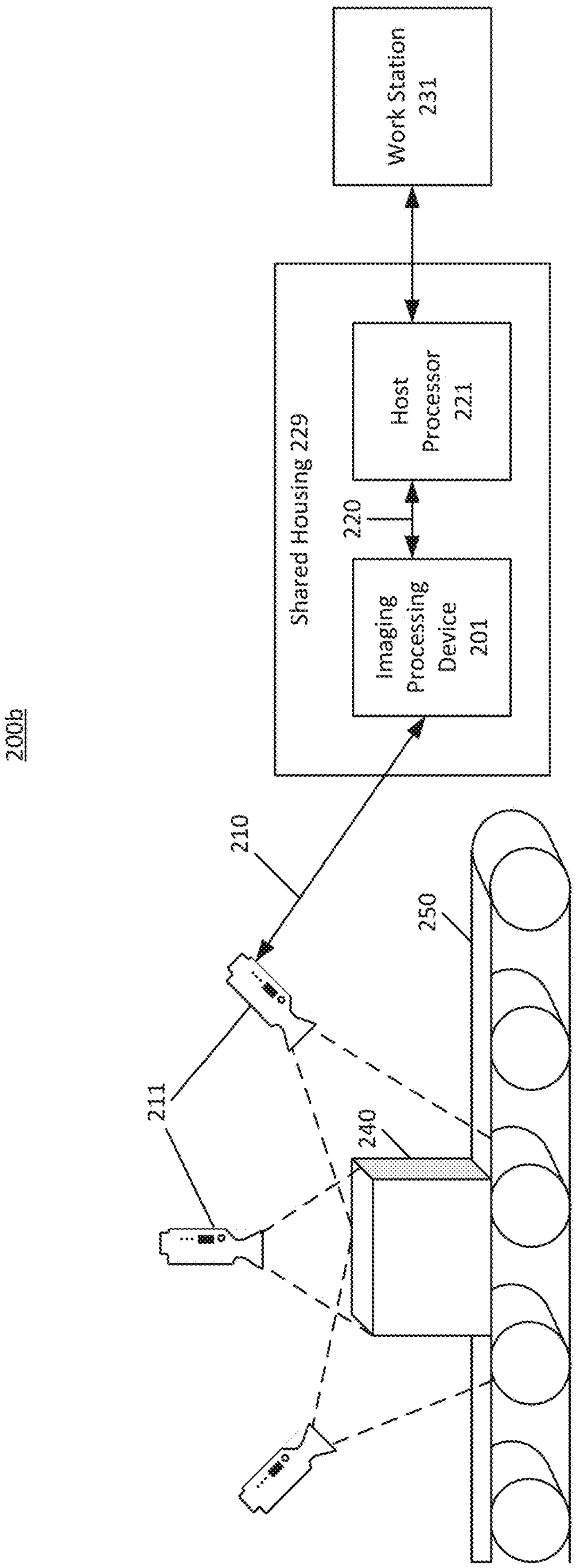
FIG. 2B illustrates another example environment for implementing the methods and systems described herein.

As an example, the machine readable instructions 123 of the host processor 121 may instruct, direct and/or cause the host processor 121 to locate indicia and/or points of interest in one or more image frames of image data. As another example, the machine readable instructions 123 of the host processor 121 may instruct, direct and/or cause the host processor 121 to decode indica located within one or more frames of image data. As yet another example, the machine readable instructions 123 of the host processor 121 may instruct, direct and/or cause the host processor 121 to apply one or more machine vision and/or machine learning models onto one or more frames of image data to identify one or more objects and/or aspects of objects within one or more image frames of image data. As a further example, the machine readable instructions 123 of the host processor 121 may instruct, direct and/or cause the host processor 121 to transmit image data, one or more selected image frames, determined candidate positions of indicia and/or points of interest, location data of indicia and/or points of interest, decoded indicia data, and/or object identification data to an external processor (e.g., a work station 231 as illustrated in FIGS. 2A and 2B). The machine readable instructions 123 of the host processor 121 may also instruct, direct and/or cause the imaging processing device 101 and/or an external processor to facilitate and/or perform the features, functions, or other disclosure described herein.

In some embodiments, any of the foregoing example machine readable instructions 123 of the host processor 121 may additionally or alternatively be the machine readable instructions 103 of the imaging processing device 101. As an example, the machine readable instructions 103 of the imaging processing device 101 may locate an indica located within one or more image frames of the image data and the machine readable instructions 123 of the host processor 121 may decode the indicia located by the imaging processing device 101. As another example, both the machine readable instructions 103 of the imaging processing device 101 and the machine readable instructions 123 of the host processor 121 may work in parallel to locate an indica located within one or more image frames of the image data.

The one or more processors 122 may include one or more registers capable of temporarily storing data, and the one or more processors 122 may include further storage capacity in the form of integrated memory slots. The one or more processors 122 may interact with the any of the forgoing (e.g., registers, integrated memory slots, one or more memories 124, etc.) to obtain, for example, machine-readable instructions corresponding to, for example, the operations represented by the flowcharts of this disclosure.

The one or more I/O ports 125 may be, or may include, any number of different types of I/O units, I/O interfaces, and/or I/O circuits that enable the one or more processors 122 of the host processor 121 to communicate with external devices (e.g., the one or more I/O ports 105 of the imaging processing device 101). In particular, the one or more I/O ports 125 of the host processor 121 may have a direct connection 120 to the one or more I/O ports 105 of the imaging processing device 101 (e.g., via dedicated coupling via a communication bus, a wired connection, a wireless connection, etc.) to allow for the host processor 121 to receive digital signals and/or data from and/or transmit digital signals and/or data to the imaging processing device 101. For example, the imaging processing device 101 may transmit image data to the host processor 121 via the direct connection 120.

The decoding module 126 may be computer-readable, executable instructions for decoding encrypted information, such as indicia (e.g., barcodes, quick-response (QR) codes, etc.). These computer-readable, executable instructions may be stored on dedicated storage units, chips, circuits, or components and/or stored on the one or more memories 124. Further, these computer-readable, executable instructions may be performed by the one or more processors 122.

The one or more network adapters 128 may include be one or more communication components configured to communicate (e.g., send and receive) data via one or more external/network port(s) over one or more communication networks. For example, the one or more network adapters 128 may be, or may include, a wired network adapter, connector, interface, etc. (e.g., an Ethernet network connector, an asynchronous transfer mode (ATM) network connector, a digital subscriber line (DSL) modem, a cable modem) and/or a wireless network adapter, connector, interface, etc. (e.g., a Wi-Fi connector, a Bluetooth® connector, an infrared connector, a cellular connector, etc.) configured to communicate over the one or more communication networks. Additionally or alternatively, in various aspects, the one or more network adapters 128 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to the one or more communication networks.

In operation, the host processor 121 may be configured to receive (i) the image data (ii) the one or more image frames of the image data, and/or (iii) any data derived from the image data (e.g., candidate positions of indicia and/or points of interest in the image data). The host processor 121 may determine a location of one or more indicia and/or points of interest of an object in one or more image frames of the image data. In the embodiments where the host processor 121 determines the location of an indicia, the host processor 121 may then decode the indicia. In some embodiments, the host processor 121 may input the one or more image frames into a machine vision and/or machine learning model. In these embodiments, the machine vision and/or machine learning model may be trained to identify objects and/or aspects of objects based upon training data (e.g., sets of training images with corresponding identification labels).

The host processor 121 may then transmit (i) the image data (ii) the one or more image frames of the image data, and/or (iii) any determined data (e.g., the decoded data of the indicia, the object identification data, etc.) to an external processor (e.g., the work station 231, as illustrated in FIGS. 2A and 2B).

The scenario of FIG. 1A illustrates the imaging processing device 101, the imaging device 111, and the host processor 121 having separate housings. Conversely, the scenario of FIG. 1B illustrates the imaging processing device 101 and the host processor 121 having a shared housing 129.

In some demonstrative examples, the scenarios illustrated by FIGS. 1A and 1B may be implemented by a machine vision system comprising a camera as the imaging device 111, a frame grabber as an imaging processing device 101, and a vison controller as a host processor 121. Such machine vision systems may be configured, or otherwise set up, to execute various machine vision jobs in accordance with various job parameters.

A machine vision job of the machine vision system may include a collection of machine vision tools for processing image data (e.g., on every frame, on every item detected, periodically, etc.). In some embodiments, a user of the machine vision system may select the collection of machine vision tools to perform machine vision functions. For example, the user may configure an indicia scanning tool to scan over a larger/smaller area of image(s) captured by the camera.

In these demonstrative examples, the camera may be configured to capture images of surfaces or areas of a predefined search space or target objects within the predefined search space. For example, each machine vision tool included in a machine vision job may additionally include a region of interest (ROI) corresponding to a specific region or a target object imaged by the camera. The composite area defined by the ROIs for all machine vision tools included in a particular machine vision job may thereby define the predefined search space which the camera may capture in order to facilitate the execution of the machine vision job.

Similarly, the frame grabber may be configured to implement an image frame selection tool to determine which image frame should have the other tools (e.g., the indicia scanning tool) applied thereon. The frame grabber may also be configured to implement a candidate position tool to determine potential locations in the image frame of indicia and/or points of interest.

It should be appreciated that any of the machine vision tools may run in parallel with one another to optimize and/or expedite the operation of the machine vision system. Additionally, it should be appreciated that in the various embodiments where the imaging devices lack operability to perform machine vision operations locally, the analysis portion of a job may be performed on any one of the imaging processing device or the host processor. For example, image data captured by the imaging device in response to a request generated by the imagining processing device can be passed to the host processor for the execution of each of the tools of a job. In various embodiments the imaging processing device may perform certain pre-analysis operations to assist with the execution of one or more tools on the host device. Such pre-analysis may be a part of the machine vision job or it may be a feature of the imaging processing device that can be leveraged by certain machine vision tools.

Figure 2C:
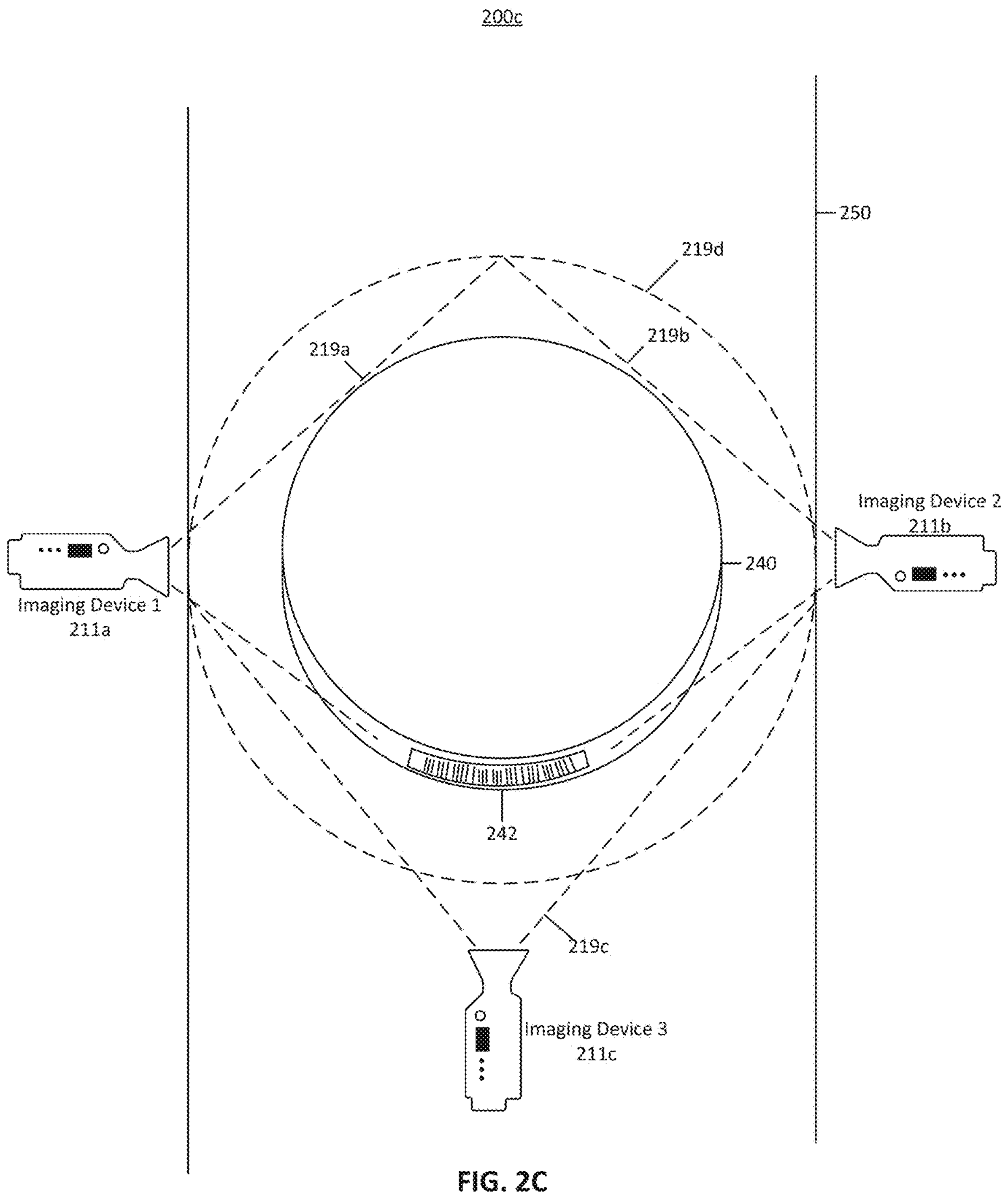
FIG. 2C illustrates a further example environment for implementing the methods and systems described herein.

FIGS. 2A, 2B, and 2C illustrate example environments 200*a*, 200*b*, and 200*c*, respectfully, for the implementation of the methods and systems described herein. The example environments 200*a*, 200*b*, and 200*c* may include an imaging processing device 201 (e.g., the imaging processing device 101), one or more imaging devices 211 (e.g., the imaging device 111), a host processor 221 (e.g., the host processor 221), a work station 231, an object 240, and/or a conveyor assembly 250.

In operation, an object 240 may be moved across the conveyor assembly 250. The one or more imaging devices 211 may capture image data of the object 240 (e.g., via the one or more image sensors 116 of the imaging devices 111) as the object moves past the one or more imaging devices 211 along the conveyor assembly 250.

In some embodiments, the object may trigger a sensor, not shown (e.g., a motion sensor, a proximity sensor, lidar, etc.). In some embodiments, the sensor may directly cause the one or more imaging devices 211 to capture the image data of the object 240. Alternatively, in some embodiments, the sensor may transmit a triggering signal to the imaging processing device 201 which may in turn send a capturing signal to the one or more imaging devices 211. In embodiments where two or more imaging devices 211 are used, the imaging processing device 201 may transmit a capturing signal instructing the two or more imaging devices 211 to capture the image data at about the same point in time. Once the one or more imaging devices 211 have captured the image data, the one or more imaging devices 211 may transmit the image data to the imaging processing device 201.

Alternatively, in some embodiments, the one or more image devices 211 may continuously capture image data. In these embodiments, the one or more image devices 211 may continuously transmit the image data to the imaging processing device 201. Upon receiving the image data, the one or more image devices 211 may select one or more frames from the image data (e.g., by using one or more image processing algorithms or techniques to determine that the object 240 is in a frame of the image data).

In some embodiments, once the imaging processing device 201 receives the image data and/or selects the one or more frames of the image data, the imaging processing device 201 may determine one or more candidate positions of an indicia 242 on the object 240 (e.g., via one or more image processing algorithms and/or techniques). For example, referring to FIG. 2C as a reference, the one or more imaging devices 211 may each capture images of the object 240 from multiple perspectives (e.g., imaging device one 211*a* may only have a left-side field of view (FOV) 219*a*, imaging device two 211*b* may only have a right-side FOV 219*b*, imaging device three 211*c* may only have a front-facing FOV 219*c*, and imaging device four, not shown, may only have a top-down FOV 219*d*). The multiple perspectives may overlap (as illustrated in FIG. 2C) which allow for the imaging processing device 201 to determine a general location across the image data. In the illustrated example, the indicia 242 is only visible in the front-facing FOV 219*c* of imaging device three 211*c*. Therefore, the imaging processing device 201 would determine the candidate position of the indicia 242 as being somewhere in the portion of the image data corresponding to imaging device three 211*c*.

A candidate position may be a set of four or more coordinate points within the frame of the image data (e.g., relating to detected and/or determined corners of the indicia), a centroid of a portion of the frame of the image data (e.g., a centroid of the indicia), a rectified bounding box within the frame of the image data (e.g., enclosing the indicia), an aligned bounding box within the frame of the image data (e.g., enclosing the indicia), and/or the like. In some embodiments, the imaging processing device 201 may determine one or more candidate positions of a point of interest of the object 240. The point of interest may be an identifying and/or defining structure, feature, and/or other aspect of the object 240.

The imaging processing device 201 may then transmit the image data, the one or more selected frames of the image data, and/or the one or more candidate positions to the host processor 221. The host processor 221 may then, in turn, (i) determine the location of the indicia 242 and/or the point(s) of interest (e.g., via one or more image processing algorithms and/or techniques), (ii) decode the indicia 242, and/or (iii) identify the object 240 and/or an aspect of the object 240 using one or more machine vision models and/or techniques. The host processor may then transmit the decoded indicia 242 and/or the identified information related to the object 240 to an external processor (e.g., work station 231). In some embodiments, the host processor may transmit the image data, the one or more candidate positions, and/or the determined locations to the external processor, and the external processor, in turn, may (i) determine the location of the indicia 242 and/or the point(s) of interest, (ii) decode the indicia 242, and/or (iii) identify the object 240 and/or an aspect of the object 240 using one or more machine vision models and/or techniques.

The work station 231 may be a general computing device (such as a desktop computing device, a laptop computer, a tablet, a mobile device, a smartphone or other smart device, a wearable device, smart contacts, smart glasses, headsets, etc.). In some embodiments, there may be a plurality of imaging processing devices 201, imaging devices 211, and/or host processors 221 capturing and/or processing image data across multiple conveyor assemblies 250 in parallel. In these embodiments, the work station 231 may act as a central hub designated to receive and/or process the plurality of image data, indicia 242, and/or identifying data of object(s) 240.

The scenario of FIG. 2A illustrates the imaging processing device 201, the one or more imaging devices 211, and the host processor 221 having separate housings. Conversely, the scenario of FIG. 1B illustrates the imaging processing device 201 and the host processor 221 having a shared housing 229.

Figure 3:
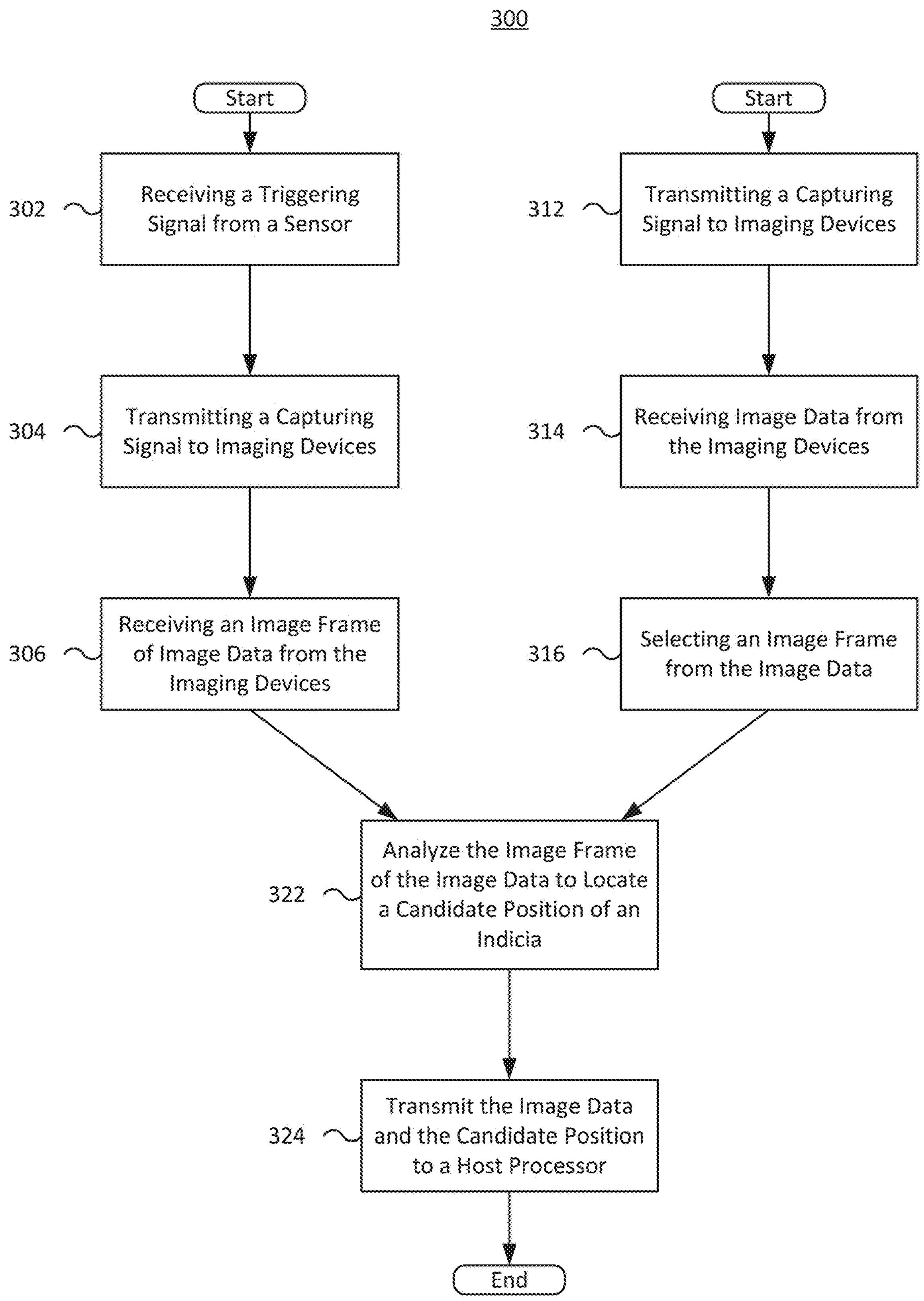
FIG. 3 is a block diagram of an example flowchart for implementing example methods and/or operations described herein.

FIG. 3 illustrates a block diagram representative of an example flowchart capable of implementing the methods and systems for the decoupling of acquisition decoding for high-speed indicia reading as described in FIGS. 1A-2C. The example flowchart of FIG. 3 is an example processing platform 300 capable of executing instructions to, for example, implement operations of the example methods described herein, as may be represented by the flowcharts of the drawings that accompany this description. Other example flowcharts capable of, for example, implementing operations of the example methods described herein include field programmable gate arrays (FPGAs) and application specific integrated circuits (ASICs).

The example processing platform 300 of FIG. 3 may be implemented by the one or more processors of an imaging processing device (e.g., the one or more processors 102 of the imaging process device 101 and/or the imaging process device 201), one or more imaging devices (e.g., the one or more processors 112 of the imaging device 101 and/or the one or more imaging devices 211), and/or a host processor (e.g., the one or more processors 122 of the host processor 121 and/or the host processor 221). In some embodiments, the example processing platform 300 may be an execution of a machine vision job as described herein.

In some embodiments, the example processing platform 300 may begin with the imaging processing device and/or the one or more imaging devices receiving a triggering signal from a sensor (302). In the embodiments where the imaging processing device receives the triggering signal, the imaging processing device may transmit a capturing signal to the one or more imaging devices to capture at least one image frame of image data (304). In these embodiments, if two or more imaging devices are employed, the capturing signal may instruct the two or more imaging devices to capture the image data at about the same point in time. Once the one or more imaging devices capture the image data, the imaging processing device may receive the image data from the one or more imaging devices (306). In the embodiments where the one or more imaging devices receive the triggering signal, the example processing platform 300 may skip block 304 and go directly to block 306 from block 302. This is because, in these embodiments, receiving the triggering signal would cause the one or more imaging devices to capture the at least one image frame of image data. Once the imaging processing device received the at least one image frame of image data, the imaging processing device may analyze the at least one image frame of the image data to locate a candidate position of an indicia and/or a point of interest of an object (322).

Alternatively, in some embodiments, the example processing platform 300 may begin with the imaging processing device transmitting a capturing signal to the one or more imaging devices to capture image data (312). In these embodiments, the capturing signal may instruct the one or more imaging devices to continuously capture the image data over a period of time. Additionally, in the embodiments where two or more imaging devices are employed, the capturing signal may configure each imaging device to be synchronized with each other imaging device such that each image frame of the image data shows about the same point in time from the multiple FOVs. Once the one or more imaging devices capture the image data, the imaging processing device may receive the image data from the one or more imaging devices (314). The imaging processing device may then select an image frame from the image data. For example, the imaging processing device may select (e.g., via one or more image processing algorithms and/or techniques) an image frame that features an object (e.g., an object 240 featuring an indicia 242 and/or other points of interest) that has just entered at least one of the FOVs of the one or more imaging devices (e.g., FOVs 219*a*-219*d* as illustrated in FIG. 2C). Once the imaging processing device selects the image frame of image data, the imaging processing device may analyze the image frame of the image data to locate a candidate position of an indicia and/or a point of interest of an object (322).

The imaging processing device may then transmit the selected and/or at least one image frame of the image data and/or the one or more candidate positions to the host processor. The host processor may then (i) determine the location of the indicia and/or the point(s) of interest in the image data (e.g., via one or more image processing algorithms and/or techniques), (ii) decode the indicia, and/or (iii) identify an object and/or an aspect of an object in the image data using one or more machine vision models and/or techniques.

The host processor may determine the location of the indicia and/or the points of interest of the object by performing an optimal traversal and/or search algorithm (e.g., binary search) across the selected and/or at least one image frame of the image data. Because most indicia are highly contrasted (with empty space having a brightness value of "255" and the indicia itself having a brightness value of "0") the host processor needs to only look for points in the image that feature this high contrast (e.g., searching for the white background of the indicia). In a similar fashion, the imaging processing device may determine the candidate positions by incompletely performing similar algorithms employed by the host processor. In some embodiments (e.g., the embodiments where the imaging processing device and the host processor share the same housing), the imaging processing device and the host processor may search for the indicia and/or the points of interest in parallel (e.g., using either parallel processing and/or recursive techniques).

The host processor may decode the indicia using any decrypting method and/or technique.

The host processor may identify the object and/or an aspect of the object using machine vision, image recognition, object identification, and/or other image processing models, systems, methods, techniques, and/or algorithms. In some embodiments, these models, systems, methods, techniques, and/or algorithms may process and/or analyze the selected and/or the at least one image frame of the image data via image classification, image recognition, and/or image identification techniques (e.g., query by image content (QBIC), optical character recognition (OCR), pattern and/or shape recognition, histogram of oriented gradients (HOG) and/or other object detection methods), two dimensional image scanning, three dimensional image scanning, and/or the like. In some embodiments, machine learning techniques—such as supervised learning, unsupervised learning, semi-supervised learning, reinforced learning, etc.—may also be used in conjunction with any of the above described machine vision, image recognition, object identification, and/or other image processing models, systems, methods, techniques, and/or algorithms.

The host processor may then transmit the decoded indicia 242 and/or the identified information related to the object to an external processor (e.g., work station 231). The example processing platform 300 may then exit.

Alternative implementations of the example processing platform 300 represented by the flowchart includes one or more additional or alternative elements, processes and/or devices. Additionally or alternatively, one or more of the example blocks of the flowchart may be combined, divided, re-arranged, added, or omitted. Components represented by the blocks of the diagram are implemented by hardware, software, firmware, and/or any combination of hardware, software and/or firmware. For example, any of the actions performed by the host processor 121 in the above described example processing platform 300 may be additionally and/or alternatively performed by the imaging processing device 101 (e.g., the imaging processing device 101 may determine the location of the indicia and/or the points of interest and/or may identify the object and/or an aspect of the object using machine vision, image recognition, object identification, and/or other image processing models, systems, methods, techniques, and/or algorithms).

Figure 4:
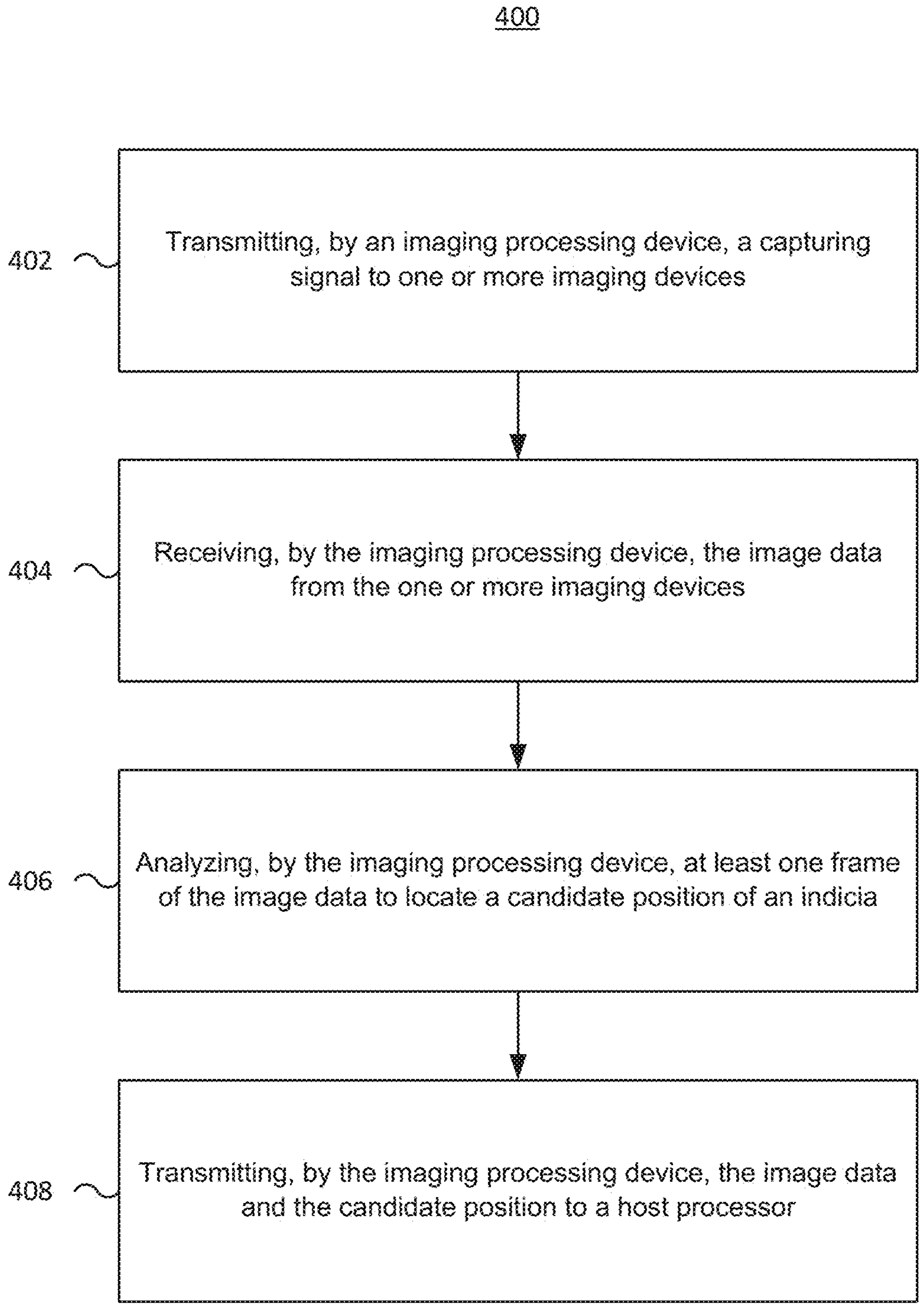
FIG. 4 is a block diagram of an example flowchart for an example method and/or operation described herein.

FIG. 4 is a block diagram of an example flowchart for an example method and/or operation 400 described herein. The method and/or operation 400 may employ any of the components, apparatuses, devices, and/or systems described herein with respect to FIGS. 1-3.

The method and/or operation 400 may begin at block 402 by transmitting, by an imaging processing device (e.g., the imaging processing device 101 and/or the imaging processing device 201), a capturing signal to one or more imaging devices (e.g., the imaging device 111 and/or the one or more imaging devices 211). In some embodiments, the capturing signal may instruct the one or more imaging devices to capture image data. Additionally or alternatively, the one or more imaging devices may be directly communicatively connected to the imaging processing device (e.g., via direct connection 110 and/or direct connection 210).

The method and/or operation 400 may proceed to block 404 by receiving, by the imaging processing device, the image data from the one or more imaging devices.

The method and/or operation 400 may proceed to block 406 by analyzing, by the imaging processing device, at least one frame of the image data to locate a candidate position of an indicia.

The method and/or operation 400 may proceed to block 408 by transmitting, by the imaging processing device, the image data and the candidate position to a host processor (e.g., the host processor 121 and/or the host processor 221). In some embodiments, the host processor may be directly communicatively connected to the imaging processing device (e.g., via direct connection 120 and/or direct connection 220) and not directly communicatively connected to the one or more imaging devices (e.g., the host processor may be only indirectly connected to the imaging devices via an intermediary such as the imaging processing device). Additionally or alternatively, in some embodiments, the host processor may be housed in one of either (i) a same housing as the imaging processing device or (ii) a separate housing as the imaging processing device. Additionally or alternatively, in some embodiments, the host processor may be configured to perform at least one of (i) locate the indicia based on the candidate position, (ii) decode the indicia to generate decoded indicia data upon locating the indicia, and/or (iii) transmit the decoded indicia data to an external processor.

The method and/or operation 400 may have more or less or different steps and/or may be performed in a different sequence.

Figure 5:
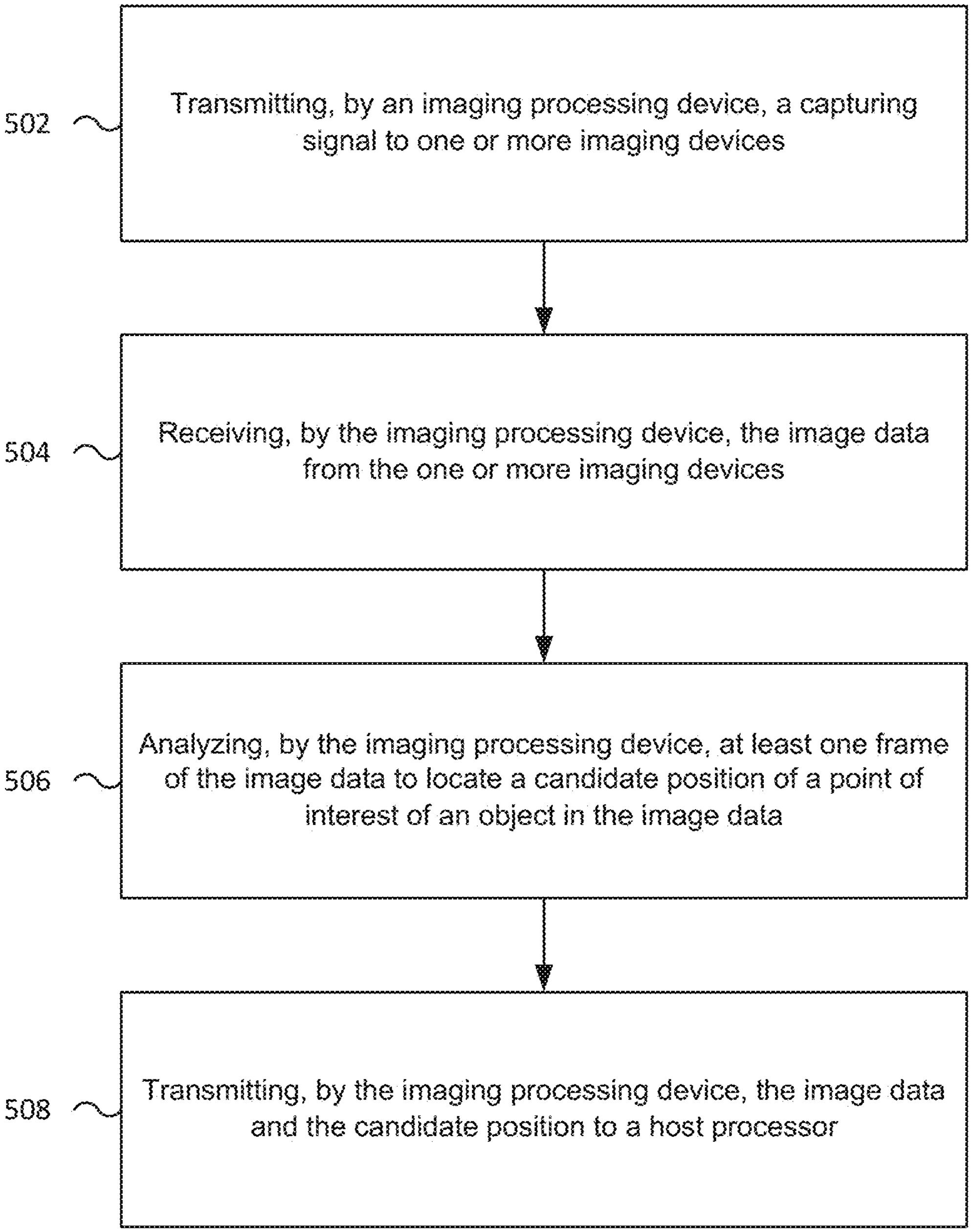
FIG. 5 is another block diagram of an example flowchart for an example method and/or operation described herein.

FIG. 5 is a block diagram of an example flowchart for an example method and/or operation 500 described herein. The method and/or operation 500 may employ any of the components, apparatuses, devices, and/or systems described herein with respect to FIGS. 1-3.

The method and/or operation 500 may begin at block 502 by transmitting, by an imaging processing device (e.g., the imaging processing device 101 and/or the imaging processing device 201), a capturing signal to one or more imaging devices (e.g., the imaging device 111 and/or the one or more imaging devices 211). In some embodiments, the capturing signal may instruct the one or more imaging devices to capture image data. Additionally or alternatively, the one or more imaging devices may be directly communicatively connected to the imaging processing device (e.g., via direct connection 110 and/or direct connection 210).

The method and/or operation 500 may proceed to block 504 by receiving, by the imaging processing device, the image data from the one or more imaging devices.

The method and/or operation 500 may proceed to block 506 by analyzing, by the imaging processing device, at least one frame of the image data to locate a candidate position of a point of interest of an object in the image data.

The method and/or operation 500 may proceed to block 508 by transmitting, by the imaging processing device, the image data and the candidate position to a host processor (e.g., the host processor 121 and/or the host processor 221). In some embodiments, the host processor may be directly communicatively connected to the imaging processing device (e.g., via direct connection 120 and/or direct connection 220) and not directly communicatively connected to the one or more imaging devices (e.g., the host processor may be only indirectly connected to the imaging devices via an intermediary such as the imaging processing device). Additionally or alternatively, in some embodiments, the host processor may be housed in one of either (i) a same housing as the imaging processing device or (ii) a separate housing as the imaging processing device. Additionally or alternatively, in some embodiments, the host processor may be configured to perform at least one of (i) locate one or more points of interest of the object based on the candidate position, (ii) identify an aspect of the object using one or more machine vision models, and/or (iii) transmit an output of the one or more machine vision models to an external processor.

The method and/or operation 500 may have more or less or different steps and/or may be performed in a different sequence.

In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit may include one or more processors 102. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging processing device comprising:

a processor; and a memory communicatively coupled to the processor, wherein the imaging processing device is configured to:

transmit a capturing signal to one or more imaging devices, the capturing signal instructing the one or more imaging devices to capture image data and the one or more imaging devices being directly communicatively connected to the imaging processing device, receive the image data from the one or more imaging devices, analyze at least one frame of the image data to locate a candidate position of an indicia, and transmit the image data and the candidate position to a host processor, the host processor being directly communicatively connected to the imaging processing device and not directly communicatively connected to the one or more imaging devices, the host processor being housed in a separate housing as the imaging processing device, and the host processor being configured to perform at least one of (i) locate the indicia based on the candidate position, (ii) decode the indicia to generate decoded indicia data upon locating the indicia, or (iii) transmit the decoded indicia data to an external processor;

wherein locating the candidate position comprises the imaging processing device incompletely performing an optimal traversal algorithm, and wherein locating the indicia comprises the host processor performing the optimal traversal algorithm.

2. The imaging processing device of claim 1, wherein the imaging processing device is further configured to:

receive a triggering signal from a sensor communicatively connected to the imaging processing device, and in response to receiving the triggering signal, transmit the capturing signal to the one or more imaging devices.

3. The imaging processing device of claim 1, wherein the image data includes a plurality of image frames across a set time period, and the imaging processing device is further configured to:

select an image frame from the plurality of image frames, and transmit the selected image frame to the host processor.

4. The imaging processing device of claim 1, wherein the imaging processing device receives the image data from two or more imaging devices and locating the candidate position of the indicia causes the imaging processing device to:

locate at least two candidate positions of the indicia within the image data, determine whether an initial candidate position of the indicia is within a threshold distance from a subsequent candidate position of the indicia, and transmit the at least two candidate positions and the determination to the host processor.

5. The imaging processing device of claim 4, wherein the capturing signal to the two or more imaging devices configure the two or more imaging devices to capture the image data simultaneously.

6. The imaging processing device of claim 1, wherein the one or more imaging devices are not configured to decode indicia.

7. An imaging processing device comprising:

a processor; and a memory communicatively coupled to the processor, wherein the imaging processing device is configured to:

transmit a capturing signal to one or more imaging devices, the capturing signal instructing the one or more imaging devices to capture image data and the one or more imaging devices being directly communicatively connected to the imaging processing device, receive the image data from the one or more imaging devices, analyze at least one frame of the image data to locate a candidate position of a point of interest of an object in the image data, and transmit the image data and the candidate position to a host processor, the host processor being directly communicatively connected to the imaging processing device and not directly communicatively connected to the one or more imaging devices, the host processor being housed in a separate housing as the imaging processing device, and the host processor being configured to perform at least one of (i) locate one or more points of interest of the object based on the candidate position, (ii) identify an aspect of the object using one or more machine vision models, or (iii) transmit an output of the one or more machine vision models to an external processor;

wherein locating the candidate position comprises the imaging processing device incompletely performing an optimal traversal algorithm, and wherein locating the one or more points of interest comprises the host processor performing the optimal traversal algorithm.

8. A computer-implemented method comprising:

transmitting, by an imaging processing device, a capturing signal to one or more imaging devices, the capturing signal instructing the one or more imaging devices to capture image data and the one or more imaging devices being directly communicatively connected to the imaging processing device;

receiving, by the imaging processing device, the image data from the one or more imaging devices;

analyzing, by the imaging processing device, at least one frame of the image data to locate a candidate position of an indicia; and transmitting, by the imaging processing device, the image data and the candidate position to a host processor, the host processor being directly communicatively connected to the imaging processing device and not directly communicatively connected to the one or more imaging devices, the host processor being housed in a separate housing as the imaging processing device, and the host processor being configured to perform at least one of (i) locate the indicia based on the candidate position, (ii) decode the indicia to generate decoded indicia data upon locating the indicia, or (iii) transmit the decoded indicia data to an external processor;

wherein locating the candidate position comprises the imaging processing device incompletely performing an optimal traversal algorithm, and wherein locating the indicia comprises the host processor performing the optimal traversal algorithm.

9. The computer-implemented method of claim 8, further comprising:

receiving, by the imaging processing device, a triggering signal from a sensor communicatively connected to the imaging processing device, and in response to receiving the triggering signal, transmitting, by the imaging processing device, the capturing signal to the one or more imaging devices.

10. The computer-implemented method of claim 8, wherein the image data includes a plurality of image frames across a set time period, and the computer-implemented method further comprises:

selecting, by the imaging processing device, an image frame from the plurality of image frames; and transmitting, by the imaging processing device, the selected image frame to the host processor.

11. The computer-implemented method of claim 8, wherein the imaging processing device receives the image data from two or more imaging devices and locating the candidate position of the indicia comprises:

locating, by the imaging processing device, at least two candidate positions of the indicia within the image data;

determining, by the imaging processing device, whether an initial candidate position of the indicia is within a threshold distance from a subsequent candidate position of the indicia; and transmitting, by the imaging processing device, the at least two candidate positions and the determination to the host processor.

12. The imaging processing device of claim 11, wherein the capturing signal to the two or more imaging devices configure the two or more imaging devices to capture the image data simultaneously.

13. The computer-implemented method of claim 8, wherein the one or more imaging devices are not configured to decode indicia.

14. A computer-implemented method comprising:

transmitting, by an imaging processing device, a capturing signal to one or more imaging devices, the capturing signal instructing the one or more imaging devices to capture image data and the one or more imaging devices being directly communicatively connected to the imaging processing device;

receiving, by the imaging processing device, the image data from the one or more imaging devices;

analyzing, by the imaging processing device, at least one frame of the image data to locate a candidate position of a point of interest of an object in the image data; and transmitting, by the imaging processing device, the image data and the candidate position to a host processor, the host processor being directly communicatively connected to the imaging processing device and not directly communicatively connected to the one or more imaging devices, the host processor being housed in a separate housing as the imaging processing device, and the host processor being configured to perform at least one of (i) locate one or more points of interest of the object based on the candidate position, (ii) identify an aspect of the object using one or more machine vision models, or (iii) transmit an output of the one or more machine vision models to an external processor;

wherein locating the candidate position comprises the imaging processing device incompletely performing an optimal traversal algorithm, and wherein locating the one or more points of interest comprises the host processor performing the optimal traversal algorithm.

* * * * *